E. B. MEYROWITZ.
SPECTACLES.
APPLICATION FILED JULY 6, 1917.
1,310,203.
Patented July 15, 1919.
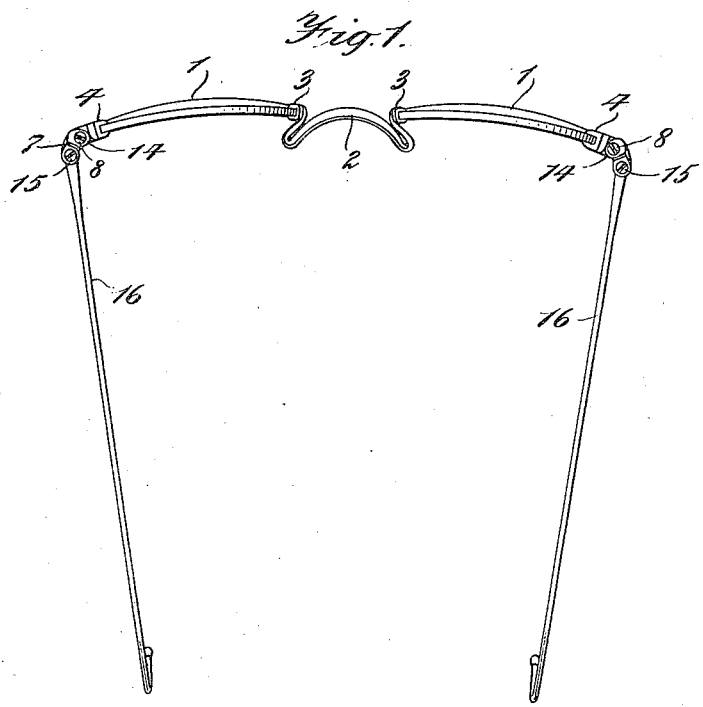
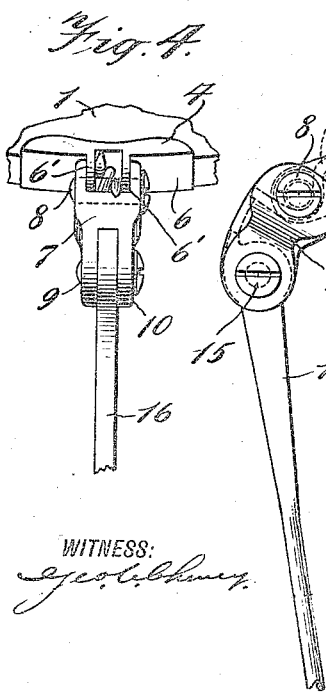
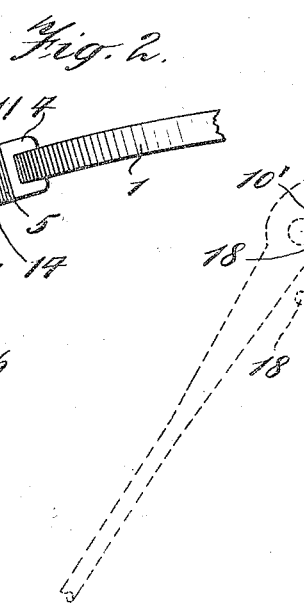
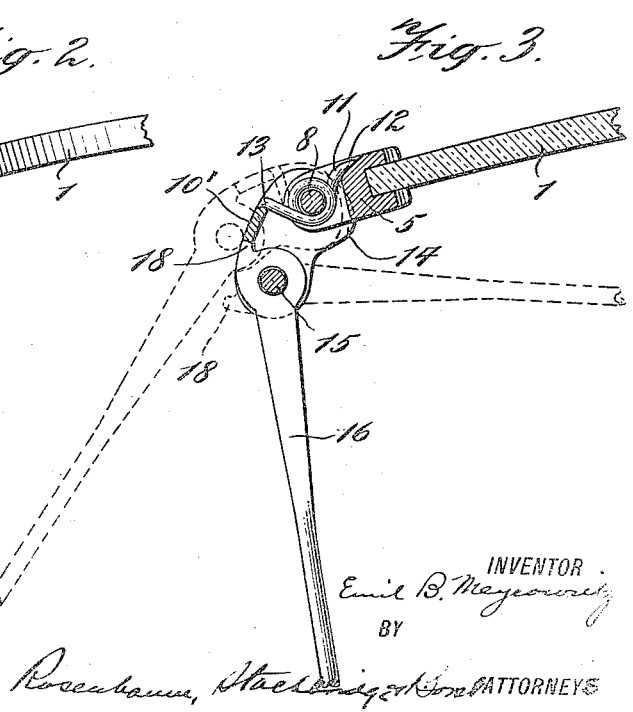

UNITED STATES PATENT OFFICE.

EMIL B. MEYROWITZ, OF NEW YORK, N. Y., ASSIGNOR TO E. B. MEYROWITZ, INC., A CORPORATION OF NEW YORK.

SPECTACLES.

1,310,203.　　　　Specification of Letters Patent.　　Patented July 15, 1919.

Application filed July 6, 1917. Serial No. 178,972.

*To all whom it may concern:*

Be it known that I, EMIL B. MEYROWITZ, a citizen of the United States, residing at the city of New York, in the borough of Manhattan and State of New York, have invented certain new and useful Improvements in Spectacles, of which the following is a full, clear, and exact description.

This invention relates to temples for spectacles, goggles and the like.

One object of the invention is to provide a mounting for a temple which will permit it to be opened beyond its normal open position without exerting any appreciable strain upon the temple or upon the post which secures the temple to the eyeglass or the eyeglass-frame.

Another object of the invention is to provide a mounting which will permit the temple to be opened as described, and yet have it return to its normal open position when in place upon the face of the wearer.

With these and other objects, which will be apparent from the detailed description hereinafter to follow when taken in connection with the accompanying drawings, the invention consists of a temple having a mounting which is so formed that the temple can be folded down upon the lenses of the spectacle in the usual manner and can be opened to its normal open position which is substantially at right angles to the lenses, in combination with an additional joint or link which will permit the temple to be opened beyond its open normal position, which joint or link is resilient and returns the temple to its normal open position after the spectacles or goggles are in position upon the face.

In the drawings:

Figure 1 is a plan of a pair of spectacles having its temples mounted in accordance with the principles of the invention;

Fig. 2 is a plan showing an enlarged view of the pivotal mounting for a temple;

Fig. 3 is a view similar to Fig. 2, partially in section, the three distinct positions of the temple beng shown in dotted lines; and Fig. 4 is an end view of Fig. 2.

Referring to Fig. 1, a pair of spectacles of a rimless type is shown, the lenses 1 being connected together by a bridge 2, which carries clamps or clips 3 at its ends which are secured directly to the lenses. Fastened directly to the outer end of each of the lenses by a clamp 4, is a temple post 5 which may be provided with a strap 6 to hold the post from lateral movement. The post 5 carries two ears 6' to which are pivoted a link 7 by means of a screw or stud 8, the link 7 being formed from two side plates 9 and 10 which are connected together by a top wall 10', the side plates of the link fitting over the two ears. Surrounding the screw 8 and interposed between the two ears 6, is a coiled spring 11, one end of which bears against the post 5 as at 12 and the other against the edge of the top wall 10' as at 13. This spring is coiled so that its tension is exerted to throw the link 7 inwardly, which inward movement is limited by a cam surface 14 formed upon the inner edge of each of the side plates 9 and 10 of the link 7. Pivoted to the other end of the link 7 by a screw or stud 15 is a temple 16. This temple may be the usual straight bow or may have hooked or curved ends to fit over the ears, as shown in Fig. 1. The temple 16 is also provided with the usual stop 18 adjacent its pivotal point, which stop engages with the edge of the top wall 10' of the link 7 to limit the outward movement of the temple 16 with respect to the link.

The manner in which the spectacle is used, is obvious from Fig. 3, where the three positions of the temples 16 are shown. To use the spectacles, the temple 16 is first opened or unfolded in the usual manner by turning it upon the pivot 15 until the stop 18 engages the wall 10' and prevents further outward movement of the temple relative to the link 7. This is the normal open position of the temple which is substantially at right angles to the lenses. Further movement of the temple will cause the link 7 to swing outwardly until it and the temple assume the dotted position shown in Fig. 3. When the temples are in this position, it is evident that the spectacles can be readily placed upon the face of the wearer, since the ends of the temples are spaced widely apart. After the spectacles are in position, the tension of the spring 13 is exerted to move the temples back to the normal open position and cause them to hug the face. When the spectacles are removed, the link 7 will move inwardly, but inward movement of the temples 16 beyond their normal open position is prevented by the stops 14 engaging the walls of the post 5. It will, therefore, be seen that the spectacles can be removed from the face and left upon a table or book in their open position ready to be placed upon the face. To replace the spectacles in their case, it is necessary to fold the temples upon the pivot 15 in the usual manner.

One of the advantages of the construction which is specific to rimless spectacles or goggles, is that no appreciable stress is placed upon the clamps 4 which secure the posts 5 to the lenses. This is important because it frequently occurs that under strain the small portion of the lens covered by the clamp will be broken away thus destroying the lens.

It is not the intention to limit the invention to rimless types of spectacles shown, since the invention is equally applicable to spectacles or goggles provided with rims in which case the posts 5 are attached to the rims instead of to the lenses direct, and the term "temple post" is intended to include both of these constructions.

I claim:

1. In a spectacle construction, a pivoted temple, a temple post, a resilient connection interposed between said pivoted temple and post, and a member carried by said temple engaging said connection for limiting the outward movement of said temple with respect to said connection.

2. In a spectacle construction, a temple post, a temple, a member between said temple and post, and a spring for resisting the outward movement of said member, said member having a limited inward movement with respect to said post and said temple having a limited outward movement with respect to said member.

3. A spectacle construction having a temple post, a temple, a link interposed between said post and temple, and resilient means acting on said link, and a stop for limiting the movement of said link.

4. A spectacle construction having a temple post, a link pivoted to said post, a spring acting on said link, a stop for limiting the movement of said link, a temple pivoted to said link, and a stop for limiting the movement of said temple with respect to said link.

In witness whereof, I subscribe my signature, in the presence of two witnesses.

EMIL B. MEYROWITZ.

Witnesses:
  M. M. ANDERSON,
  A. DITZ.